United States Patent
Beaudoin et al.

(10) Patent No.: US 7,917,854 B1
(45) Date of Patent: Mar. 29, 2011

(54) TELECOMMUNICATIONS NETWORK ADMINISTRATION GRAPHICAL USER INTERFACE

(75) Inventors: Luc Beaudoin, Gatineau (CA); Suzanne Rochford, Hull (CA); Brian Beaton, Ottawa (CA)

(73) Assignee: Nortel Networks Limited, Mississauga, Ontario (CA)

( * ) Notice: Subject to any disclaimer, the term of this patent is extended or adjusted under 35 U.S.C. 154(b) by 1946 days.

(21) Appl. No.: 10/391,809

(22) Filed: Mar. 20, 2003

Related U.S. Application Data

(60) Provisional application No. 60/421,671, filed on Oct. 28, 2002.

(51) Int. Cl.
    *G06F 15/177* (2006.01)
    *G06F 3/00* (2006.01)

(52) U.S. Cl. ......... 715/734; 715/735; 715/736; 715/738

(58) Field of Classification Search .................. 715/734, 715/735, 736, 738
See application file for complete search history.

(56) References Cited

U.S. PATENT DOCUMENTS

| | | | | |
|---|---|---|---|---|
| 6,112,015 A * | 8/2000 | Planas et al. | ................... | 709/223 |
| 6,385,197 B1 * | 5/2002 | Sugihara | ....................... | 370/380 |
| 6,904,569 B1 * | 6/2005 | Anderson | ..................... | 715/851 |
| 6,957,263 B2 * | 10/2005 | Galou et al. | .................. | 709/227 |
| 6,981,228 B1 * | 12/2005 | Chen et al. | ..................... | 715/853 |
| 7,047,496 B2 * | 5/2006 | Nelles et al. | .................. | 715/736 |
| 2002/0147809 A1 * | 10/2002 | Vinberg | ...................... | 709/224 |

OTHER PUBLICATIONS

Technical Research Report, Visual Information Seeking: Tight Coupling of Dynamic Query Filters With Starfield Displays by C. Ahlberg & B. Schneiderman. TR93-71, Dept. of Computer Science, Human-Computer Interaction Laboratory & Institute for Systems Research; University of Maryland, College Park, MD 20742.

* cited by examiner

*Primary Examiner* — Dennis Bonshock

(57) ABSTRACT

This invention provides an improved graphical user interface (GUI) for telecommunications network administration. The GUI allows a network administrator to maintain an association between a link bundle and the contents of that link bundle by displaying a network topology including the link bundle, as well as the contents of that link bundle in the same window. The GUI further allows easy navigation between groups of NE's wherein there are a number of inter-group links extending from a particular NE, by displaying characteristics of these links in the same window as a network topology of the NE group under investigation, and allowing the user to follow a selected one of these links to a different NE group.

51 Claims, 7 Drawing Sheets

TELECOMMUNICATIONS NETWORK ADMINISTRATION GRAPHICAL USER INTERFACE

RELATED APPLICATION

This application claims the benefit of provisional application Ser. No. 60/421,671 filed Oct. 28, 2002 entitled "Tightly Coupled Container and Content Method", inventors Beaudoin, Rochford and Beaton.

FIELD OF THE INVENTION

This invention relates to graphical user interfaces, and in particular to graphical user interfaces used to assist in administering telecommunications networks.

BACKGROUND OF THE INVENTION

As telecommunications networks have become increasingly complex, the effective administration of such networks, including to increase efficiency and to reduce error-rates, has become more and more difficult.

Telecommunications networks consist of a number of network components which may generally be classed as network elements (NE's), and links.

NE's such as transmitters, amplifiers, routers, antenna base stations, etc. generally transmit, manipulate, and/or receive a telecommunication signal either passively or actively. NE's can be either a single device, or may be a collection of devices, or even a sub-network of devices including links therebetween, performing a particular function, or located in a particular geographic location.

Links carry signals between NE's, whether through optical fibers, copper wires, microwaves, or through other media. A link may be a physical link, for example a single optical fiber carrying only one signal. Alternatively, a link may be a logical link, for example one of many lambda's or wavelengths of a multiplexed-signal-carrying optical fiber.

To assist in the administration of telecommunications networks, network administrators typically use graphical user interfaces (GUI's) operating on a computer system connected to the network. Information is gathered from the network components by the computer system, and is displayed in the GUI for viewing by the network administrator. The functioning of the network can also often be manipulated by the network administrator using the GUI. Using such GUI's, network administrators can, among other things, view the status of data transmission over the network, improve the efficiency of the network, maximize use of the network components, and be altered to, and locate alarms in the network.

One useful view which is often incorporated into a network administration GUI is a network topology, namely a graphical representation of a geographic and/or logical structure of the network. Such topologies allow network administrators to easily and quickly understand the interaction between different network components which form the network. The structure of the network is typically represented in the network topology by displaying NE icons representing the NE's, and link lines drawn between the NE icons representing links which carry signals between these NE's.

As networks have become increasingly complex, various solutions have been provided to allow the topology of the network to be viewed in a meaningful manner.

For example, where the network has a large number of NE's, such that the representation of each NE and link in a single view would render the network topology extremely complex and impossible to read, a common solution is to divide the NE's of the network into a number of NE groups, divided either logically, or geographically. A means is then provided for the network administrator to select the NE group to view, and then only those NE's belonging to the selected NE group, and the links associated therewith, are represented in the network topology. Of course, multiple windows displaying network topologies of the same NE group, or different NE groups could be open at the same time.

Another source of network topology complexity is where there exist multiple links between a pair of NE's, in a link bundle. Where the number of links in a link bundle is small, the multiple links may be represented by multiple link lines drawn between a pair of NE icons. However, where a link bundle contains a large number of links, as can be the case of example where there exist a number of multiplexed lambda's or wavelengths on an optical fiber or where a large number of physically separate links are represented together as a link bundle for convenience, the representation of these individual links becomes complex, and the display of multiple link lines renders a network topology too cluttered to easily comprehend. In such cases, instead of representing each of the links between a pair of NE's individually, a convention has arisen to use a different, and visually distinctive representation of the link bundle between the two NE's, for example by displaying a thick line between the corresponding NE icons instead of a thin line. Thus, a network topology could contain both thin link lines and thick link bundle lines displayed between NE icons, representing single links, and link bundles, respectively.

When viewing a network topology, network administrators may at times need to obtain further information about a particular link bundle, for example where the GUI indicates that a performance alarm has arisen in respect of that link bundle. Network administration GUI's have typically addressed this need by allowing network administrators to select the link bundle line representing the affected link bundle, whereupon a link bundle content window would be opened, displaying information for each of the links contained in that link bundle, typically in a tabular format.

However, as the analysis of network administration issues has become increasingly complex, this method of viewing the contents of link bundles has become inadequate. Mainly, in considering a particular network issue, it may be necessary for the network administrator to view the contents of multiple link bundles at the same time. This results in the simultaneous display of multiple link bundle content windows. Where there are only two or three such link bundle content windows open, the network administrator may, with some effort, be able to recall which link bundle line in the network topology is associated with each link bundle content window. The network administrator may be assisted in this regard through identification aids, such as the use of descriptive information appearing in the header for each link bundle content window, or by upon selection of a link bundle content window, highlighting in the network topology the associated link bundle line. However, such aids tend to be ineffective, and the extra coding and processing required to maintain such window linking and state management can result in performance degradation.

In any event, such aids become wholly inadequate as the number of link bundle content windows the network administrator needs to view increases from two or three to five or even ten. In such cases, it becomes almost impossible for the network administrator to keep track of which link bundle content window relates to which link bundle. Thus, a problem of association occurs, which leads to difficulty analyzing the network and the particular issue the network administrator is seeking to address.

Indeed, this problem is exacerbated where in analyzing the issue, the network administrator needs to view the contents of link bundles associated with more than one NE group, as is often the case. In such circumstances, instead of the GUI displaying a single network topology window displaying the topology for one NE group, the GUI would need to display multiple network topology windows displaying topologies for multiple NE groups. If the network administrator then opens a number of link bundle content windows to view the contents of link bundles associated with these NE groups, he or she will be faced with multiple network topology windows, and multiple link bundle content windows, with no easy means of identifying the origin of each link bundle content window.

This scenario raises other problems. For example, owing to desktop clutter resulting from the large number of open windows, it may be difficult to find the window of interest. Further, when the network administrator wishes to view the network topology associated with a particular link bundle content window the bringing of that network topology window into focus may obscure the link bundle content window of interest requiring the network administrator to move one or the other of the windows. Additionally, a problem of orphan windows may result when the network administrator closes a network topology window leaving behind link bundle content windows originating from that network topology window with no reference topology window.

Thus, present network administration GUI's do not provide a means of viewing the contents of link bundles in a manner which allows network administrators to easily associate the contents of link bundles with the link bundles themselves.

Another problem commonly faced by network administrators when using network administration GUI's arises when attempting to follow a link from one NE group to another. In a typical network administration GUI, a network topology displaying the structure of one NE group will indicate where an NE has a link to an NE of a second NE group. This inter-group link is usually indicated by displaying a link line extending from an NE icon and terminating with an off-page connector icon. Upon selecting the off-page connector icon, the GUI will display, either in a separate window or in the same window, a network topology displaying the structure of the second NE group.

This is relatively straightforward where there exists only a single inter-group link associated with a particular NE, or even where there are multiple inter-group links associated with that NE, each of such inter-group links terminating at a single other NE of a single other NE group. However, difficulties arise where these multiple inter-group links associated with a particular NE terminate at multiple different NE's of a single other NE group, or multiple other NE groups. In such cases, the readily understood display of information about these inter-group links, the navigation between the present NE group and the NE group at which an inter-group link terminates, as well as the representation in the network topology of these inter-group links, all become very difficult.

SUMMARY OF THE INVENTION

This invention provides an improved method in a computer system of displaying network information for telecommunications network administration. The method allows a network administrator to easily maintain an association between a link bundle and the contents of that link bundle by displaying a network topology including the link bundle, as well as the contents of that link bundle in the same window.

The method further allows easy navigation between groups of NE's (NE groups) wherein there are a number of inter-group links extending from a particular NE of a first NE group to NE's of other NE groups, by displaying characteristics of these links in the same window as a network topology of the first NE group, and allowing the user to optionally follow a selected one of these links to a different NE group.

Thus, in a broad aspect, the present invention provides a method in a computer system for displaying network management information for a telecommunications network having a plurality of network elements (NE's) and a plurality of links, each of said links adapted to carry a signal between a pair of said NE's. The telecommunications network has at least one pair of NE's having therebetween a plurality of links in a link bundle adapted to carry multiple signals between said pair of NE's. According to this method, a network topology panel is displayed in a first window, with a selectable graphical representation of the link bundle. Upon selection of the graphical representation of the link bundle, information about each of the links of which the link bundle is comprised is displayed in a link bundle content panel in said first window.

In other aspects, the telecommunications network is divided into a number of NE groups. The network topology panel then displays graphical representations of the NE's, the links and the link bundles of a first NE group. An option to open a new window displaying either the first NE group or another NE group may be provided.

The present invention also provides a method in a computer system for displaying network management information for a telecommunications network. In the context of this method, the telecommunications network has a number of network elements (NE's) divided into a number of NE groups, and also has a number of links, each link being adapted to carry a signal between a pair of the NE's, wherein a number of links in an inter-group link set are adapted to carry signals between a transferring NE of a first NE group and at least one NE not contained in the first NE group. According to this method, a graphical representation of the transferring NE of the first NE group is displayed in a network topology panel in a first window. Additionally, a selectable graphical representation of the inter-group link set is displayed in proximity to the graphical representation of the transferring NE. Upon selection of the graphical representation of the inter-group link set, information about each of the links of which the inter-group link set is comprised is displayed in an inter-group link set content panel in said first window. Optionally, a selectable follow-link option may be displayed in the first window, and upon selection of information for one of the links displayed in the inter-group link set content panel, as well as the follow-link option, wherein the selected link is adapted to carry a signal between the transferring NE of the first NE group and terminating NE of a second NE group, graphical representations and link information are displayed either in the first window, or in a second window.

The present invention also contemplates a computer readable medium containing instructions for implementing the above methods, and a computer system adapted to implement the methods.

Advantageously, the present invention allows a network administrator to more easily examine the contents of link bundles, to view inter-group link sets, and to follow links of which an inter-group link set is comprised.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Before describing the appearance and performance of a preferred embodiment of the method of the present invention, a demonstration of which is illustrated in FIGS. 3 through 6, an exemplary computer system context for the application of the preferred embodiment method will first be described with referenced to FIG. 1, and an exemplary telecommunication network to be displayed and explored using the preferred embodiment method will be described with reference to FIG. 2.

Figure 1:
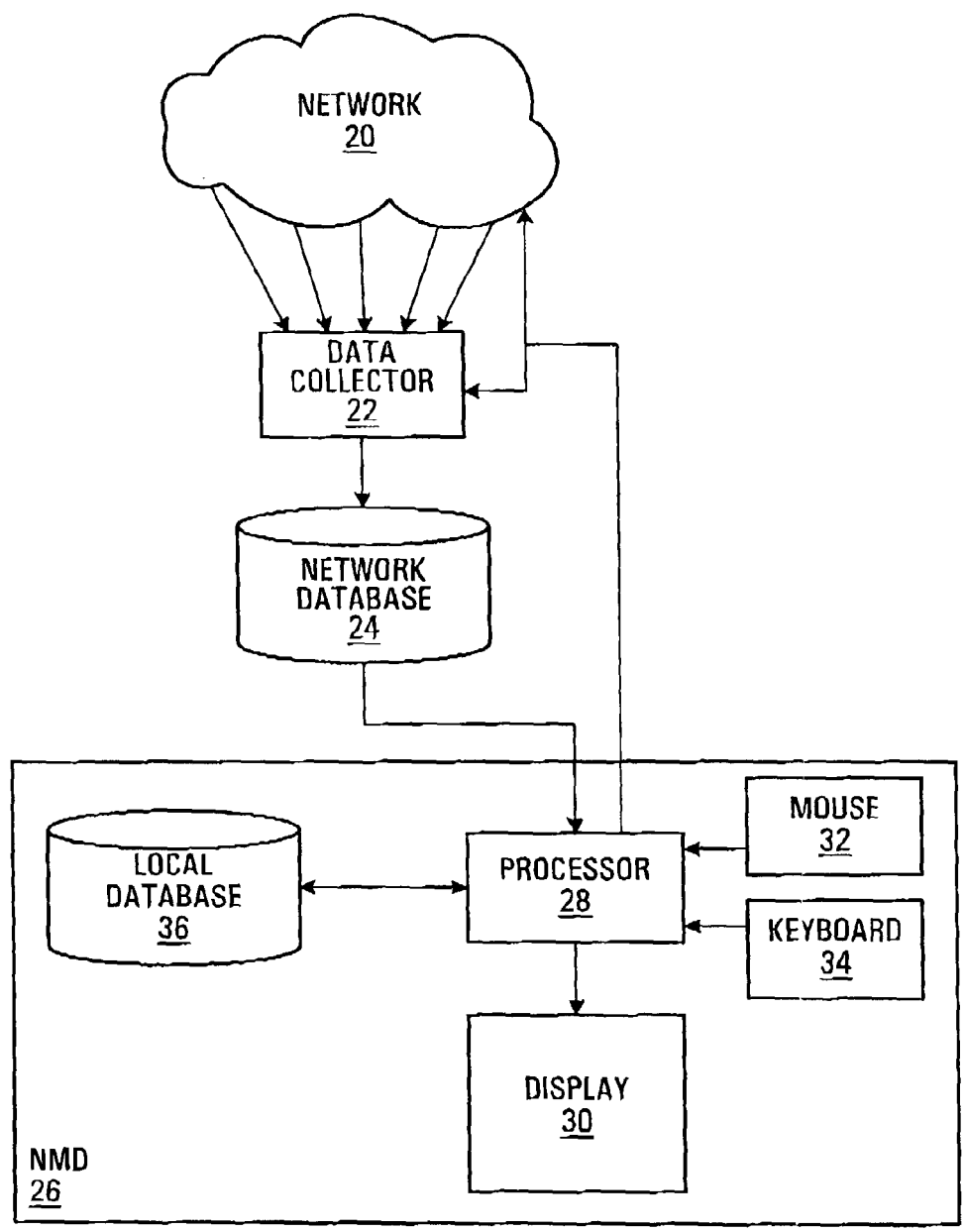
FIG. 1 is a block diagram of an exemplary computer system context for the execution of the preferred embodiment of the method of the present invention.

FIG. 1 is a block diagram of a typical computer system used by a network administrator to administer a telecommunication network. In this illustration, the network 20 is connected to a data collector 22 which in turn is connected to a network database 24. The network database 24 is then connected to a network management device, or NMD 26.

The data collector 22 is capable of collecting network information from the network 20. Such network information may include for example, a level of traffic across NE's and links of the network, or status information representing the status of various NE's and links contained in the network 20. Status information may include any alarms which may be detected at such NE's or links. The manner in which the data collector 22 collects network information from the network 20, as well as the types and formats of network information which may be collected, are well known in the telecommunication field.

Upon receipt of network information from the network 20, the data collector 22 stores this network information in the network database 24. The network database 24 may also have stored thereon architectural, technical, or identification data for the network components.

The NMD 26 has a network management processor 28 which is connected to a display 30, and also to user input devices such as a mouse 32 and a keyboard 34. If the display 30 is touch sensitive, then the display itself may also serve as a user input device. The processor 28 is also connected to a local database 36. The NMD 26 is generally adapted to perform four functions. First, it executes the preferred embodiment of the method of the present invention to interactively display network management information on the display 30. Second, it processes data stored in the network database 24 as well as the local database 36, in accordance with the method of the present invention as well as instructions received from a network administrator through the user input devices 32, 34, to put it into a form suitable for display. Third, in some cases, the NMD 26 may request the data collector 22 to obtain certain specific information from the network 20. Finally, the NMD 26 may manipulate the performance of the network 20, for example by respecifying a different path of data transmission for a specific data stream.

Although one exemplary context for the application of a preferred embodiment of the method of the present invention has been described in detail above, it is to be understood that the method may be used in other contexts. Notably, the computer system executing the method may be any system wherein a processor is connectable to a network or a database containing network information, and which is capable of displaying graphical information and receiving user inputs.

Figure 2:
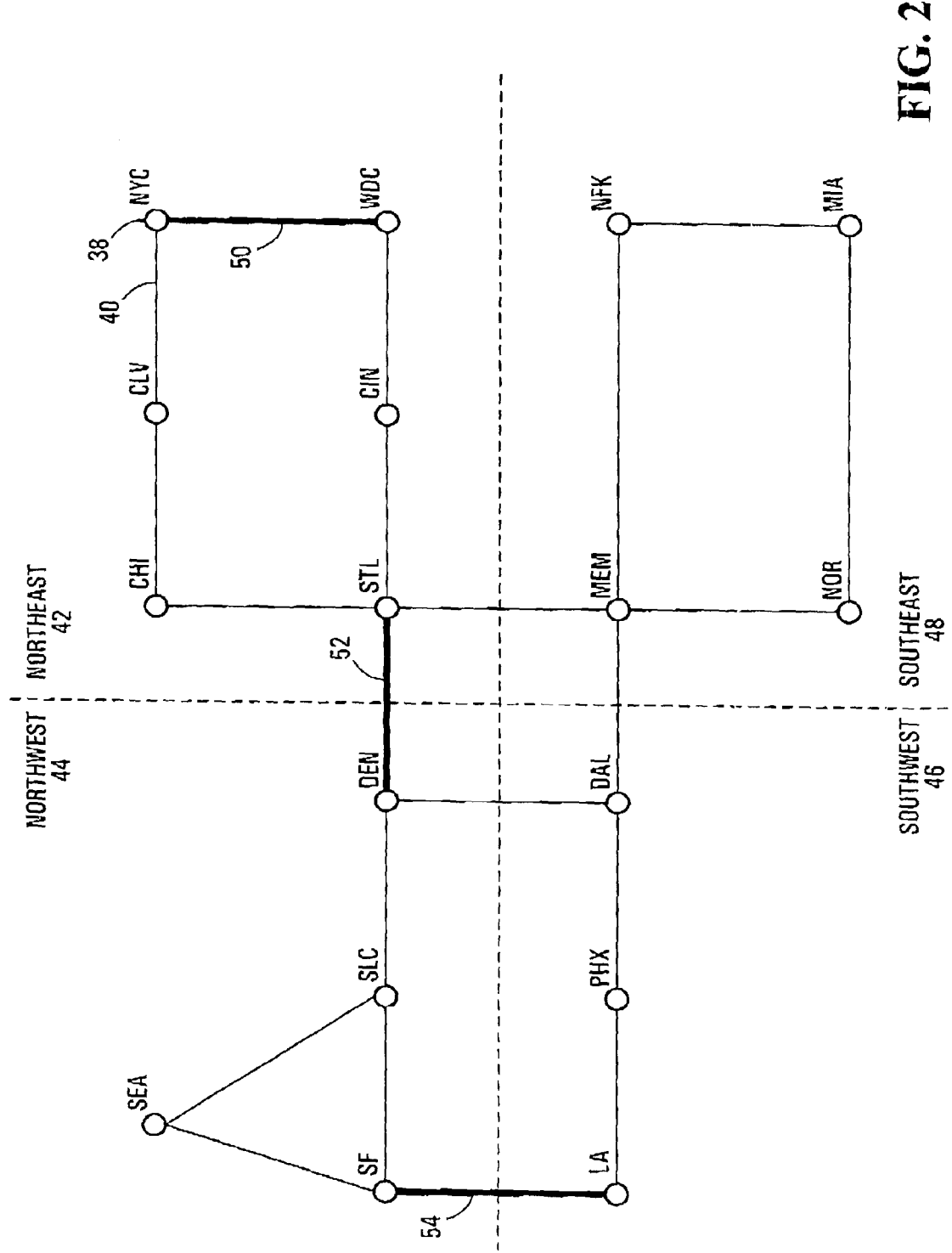
FIG. 2 is a simple depiction of the topology of an exemplary telecommunications network used to demonstrate the preferred embodiment of the method of the present invention.

FIG. 2 depicts a basic structure of an exemplary telecommunication network which is displayed and explored in the demonstration of the preferred embodiment of the method of the present invention illustrated in FIGS. 3 through 6. The exemplary telecommunication network is one located in the United States. Network elements in the network are represented by circles (38 for example), while links between these network elements are represented by lines (40 for example). In this case, the network is divided geographically into four network element groups (or "NE groups"), namely the Northeast NE group 42, Northwest NE group 44, Southwest NE group 46, and the Southeast NE group 48. In certain cases, links are represented using a thick line instead of a thin line. For example, the link between NYC and WDC is represented as a thick line 50. This thick line signifies that there are multiple links in a link bundle between the two NE's NYC and WDC, adapted to carry multiple signals between these two NE's. Link bundles are also represented between STL and DEN 52, and between SF and LA 54 in this basic structure of the exemplary telecommunication network.

A preferred embodiment of the method of the present invention will now be described with reference to FIGS. 3 through 6. Although this preferred embodiment method may have many additional features relevant to the administration of a telecommunications network, only those which are related to the present invention will be described below.

Figure 3:
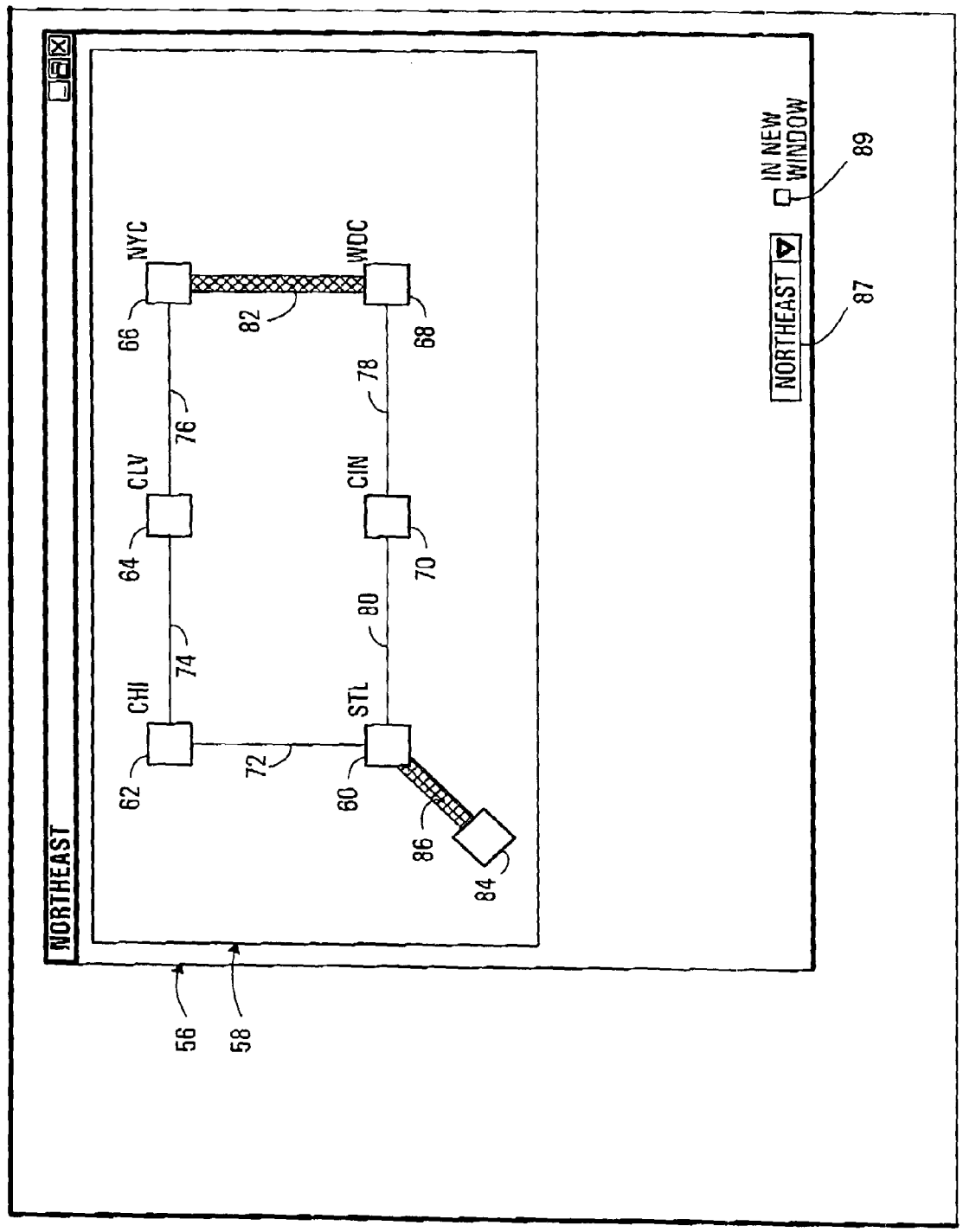
FIG. 3 illustrates a first network view window generated in accordance with the preferred embodiment of the method of the present invention.

In FIG. 3, the network administrator has selected to explore the Northeast NE group 42. Such selection may have been made using any of a number of well-known techniques, such as through pull-down menus, pop-up menus, selection from a list, etc. As a result, the processor 28 has displayed on the display 30, a first network view window 56, in which is displayed a network topology panel 58.

In the network topology panel 58 is displayed a network topology of the selected Northeast NE group 42. This network topology includes the NE icons (60 for example), representing the NE's of this NE group, link lines (72 for example) representing single links between NE's, as well as link bundle lines (82 for example) representing link bundles between NE's.

In the illustrated example, the NE icons (60 for example) representing the NE's of the selected NE group appear as boxes. Of course, icons of any shape, colour, pattern, etc. may be used for this purpose. In this case, six NE icons (60, 62, 64, 66, 68 and 70) are displayed in the network topology panel 58 representing the six NE's of the selected Northeast NE group 42.

In the network topology panel 58, where the telecommunications network has only a single link adapted to carry a signal between a pair of NE's of the selected Northeast NE group 42, the network topology panel 58 displays a thin link line (72 for example) between the associated NE icons. Thus, in the illustrated example, link lines (72, 74, 76, 78 and 80 respectively) are displayed between the STL 60 and CHI 62 NE icons, the CHI 62 and CLV 64 NE icons, the CLV 64 and NYC 66 NE icons, the WDC 68 and CIN 70 NE icons, and the CIN 70 and STL 60 NE icons.

Where the telecommunications network has a plurality of links in a link bundle adapted to carry a plurality of signals between a pair of NE's of the selected Northeast NE group 42, the network topology panel 58 displays a thick link bundle line (82 for example) between the associated NE icons. In the examplary telecommunications network used to demonstrate the preferred embodiment method, a link bundle is adapted to carry a plurality of signals between the NYC and WDC NE's. As such, a thick link bundle line 82 is displayed between the NYC NE icon 66 and the WDC NE icon 68.

Still referring to FIG. 3, where in the preferred embodiment method the telecommunications network includes one or more inter-group links adapted to carry signals between a transferring NE of the NE group displayed in the network topology panel 58 and one or more terminating NE's of other NE groups, this fact is communicated by displaying an off-page connector icon in proximity to the NE icon representing that transferring NE. As shown in FIG. 2, the exemplary telecommunications network includes a plurality of inter-group links, for example between the STL and DEN NE's, the DAL and MEM NE's, and the SF and LA NE's. With specific reference to the Northeast NE group 42, the STL NE is a transferring NE of the Northeast NE group 42 in the sense that inter-group links originate from this NE. This fact is communicated in the network topology panel 58 in FIG. 3 by displaying an off-page connector icon 84 in proximity to the STL NE icon 60. The off-page connector icon 84 is visually distinguished from the NE icons (60 for example). In this example, the off-page connector icon 84 is a diamond, whereas the NE icons (60 for example) are squares. Of course, other means of visually distinguishing the off-page connector icon 84 from the NE icons (60 for example) may be used, different colours, different internal shading, or other shapes for example.

Where the telecommunications network includes only a single inter-group link between a transferring NE of the NE group displayed in the network topology panel 58, and terminating NE's of other NE groups, an inter-group link line (not shown) is displayed between the icon representing the transferring NE and the associated off-page connector icon. Such an inter-group link line may be displayed as a thin line (again, not shown).

However, in the present example the telecommunications network includes a plurality of inter-group links between the STL transferring NE of the Northeast NE group 42 and NE's of other NE groups. This collection of inter-group links originating from a single transferring NE of the NE group displayed in the network topology panel 58 may be referred to as an inter-group link set. Thus, in the illustrated example, all of the inter-group links originating from the STL NE and terminating at the DEN NE and MEM NE's form a single inter-group link set. To communicate that there is an inter-group link set as opposed to a single inter-group link originating from the STL NE, an inter-group link set line 86, which is visually distinguished from an inter-group link line (not shown), is displayed between the STL NE icon 60 and its associated off-page connector icon 84. In this example, the inter-group link set line 86 is visually distinguished from an inter-group link line (not shown) by displaying a thick line instead of a thin line.

Although in the illustrated example the link bundle lines (82 for example) are visually distinguished from the link lines (72 for example) by using thick lines instead of thin lines, and similarly inter-group link set lines 86 are visually distinguished from inter-group link lines (not shown) in like manner, it is to be understood that any of a number of well known methods of visually distinguishing may be used, for example by using lines of different colours, lines having different patterns such as dotted, hatched, cross-hatched, etc.

Finally, the first network view window 56 illustrated in FIG. 3 also includes two additional features. The first is an NE group selector 87, which in this case is a pull-down menu. The second is a new window selector 89, which in this case is a check box. Using these two features, the network administrator can select the NE group to be displayed in the first network view window 56, or select to open a second network view window (not shown) having the same features as the first network view window 56, but displaying the NE group selected in the NE group selector 87. The ways in which these selections may be made are well known in the GUI field.

Figure 4:
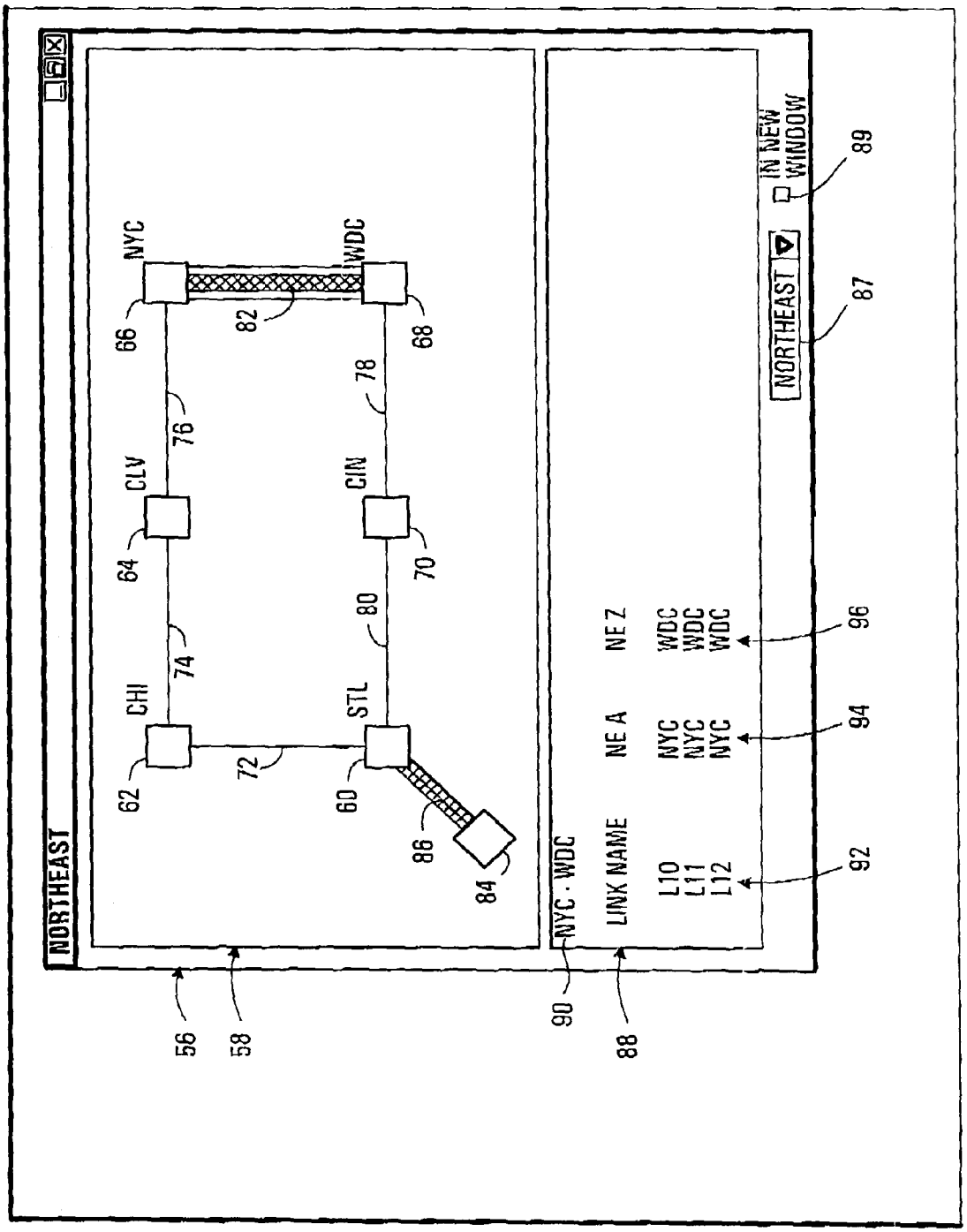
FIG. 4 illustrates the first network view window of FIG. 3 wherein a network administrator has selected an NYC-WDC link bundle.

In FIG. 4, the network administrator has selected the link bundle line 82 between the NYC NE icon 66 and the WDC NE icon 68, so as to more closely investigate the links of which the link bundle between the NYC and WDC NE's are comprised. As a result of this selection, the NMD 26 has highlighted the relevant link bundle line 82, and displayed a link bundle content panel 88 in the first network view window 56 containing information about each of the links of which the selected link bundle is comprised, in tabular format. In this example, the highlighting of the link bundle line 82 has been accomplished by outlining the link bundle line 82. Of course other forms of highlighting could be used, using a distinctive colour or pattern, for example.

In the illustrated example, the link bundle content panel 88 first displays a link bundle identifier 90 indicating in this case that the link bundle under investigation is that adapted to carry a plurality of signals between the NYC and WDC NE's. The link bundle content panel 88 also displays the names 92 assigned to each of the links of which the link bundle under investigation is comprised, and an identification of the two NE's (94 and 96) between which each link carries a signal. In this example, these two NE's are identified using the terms "NE A" and "NE Z". However, the selection of which of the two NE's between which each link carries a signal is the "NE A" or "NE Z" is largely arbitrary and is typically independent of the direction in which a signal is actually carried on that link. Thus, in the illustrated example, the NYC NE is identified as the "NE A" 94, and the WDC NE is identified as the "NE Z" 96 for each of the three links L10, L11 and L12 of which the NYC-WDC link bundle is comprised.

Although not an option in the particular NE group displayed in the network topology panel 58 in FIG. 4, if the network administrator were to select a hypothetical other link bundle line in the network topology panel 58, then the information in the link bundle content panel 88 would be updated to display information about each of the links of which the selected link bundle is comprised.

By displaying both the link bundle content panel 88 and the network topology panel 58 in the same window, information about a selected link bundle, and the origin of that information, namely the location of the link bundle in the telecommunication network, are always associated. If multiple link bundles in one or more NE groups need to be investigated simultaneously, several network view windows may be opened by the network administrator using the NE group selector 87 and the new window selector 89. Because a link bundle content panel 88 and an associated network topology panel 58 are displayed in the same window, the association between the two is not lost despite this simultaneous investigation of multiple link bundles.

Figure 5:
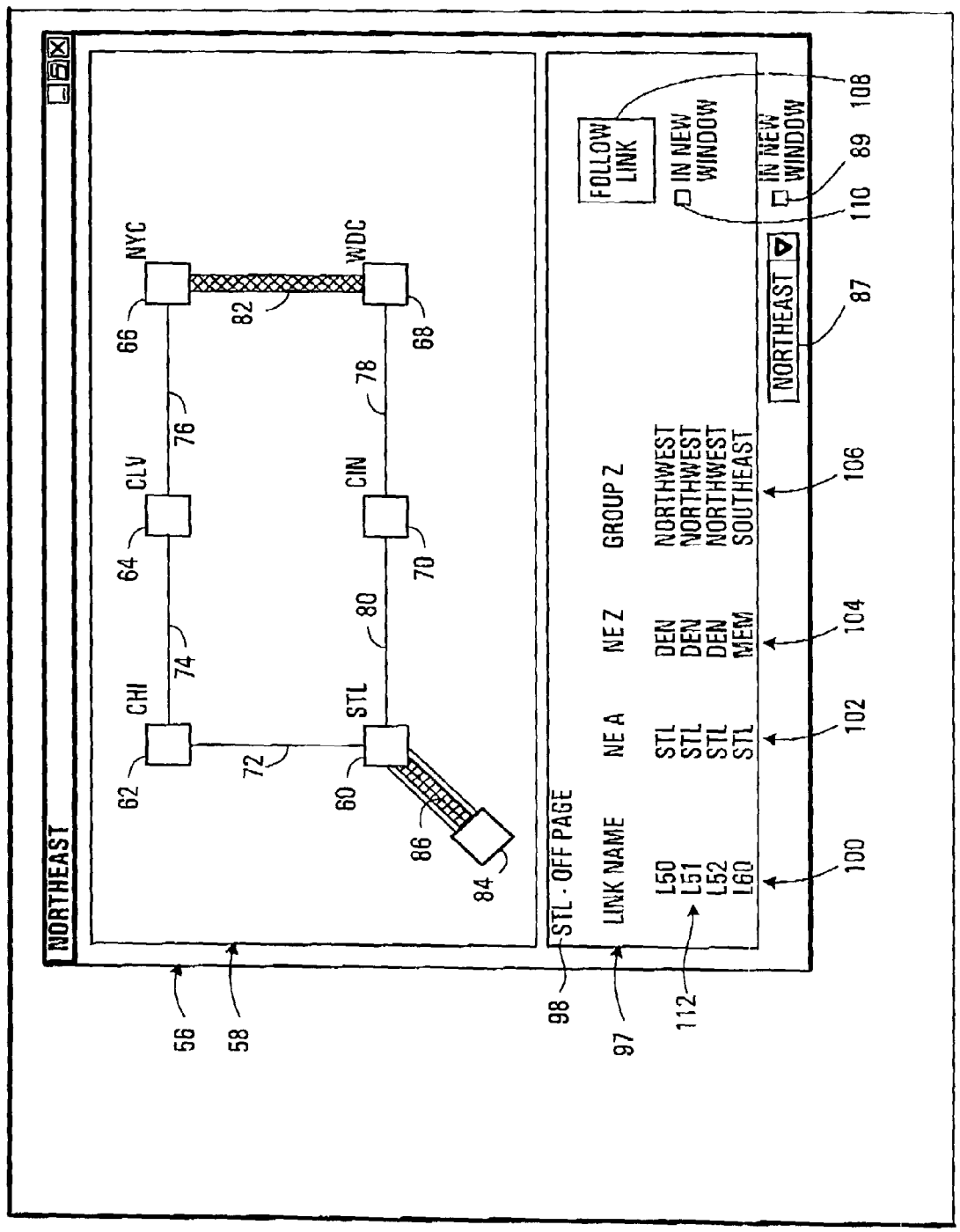
FIG. 5 illustrates the first network view window of FIG. 3 wherein the network administrator has selected as STL-Off-Page inter-group link set.

In FIG. 5, the network administrator has selected the inter-group link set line 86 between the STL NE icon 60 and its associated off-page connector icon 84, so as to more closely investigate the links of which the inter-group link set extending from the STL NE are comprised. As a result of this selection, the processor 28 has highlighted the relevant inter-group link set line 86, and displayed an inter-group link set content panel 97 in the first network view window 56 containing information about each of the links of which the inter-group link set is comprised, in tabular format. Again, in this example, the highlighting of the inter-group link set line 86 has been accomplished by outlining the inter-group link set line 86. Of course other forms of highlighting could be used, using a distinctive colour or pattern, for example.

In the illustrated example, the inter-group link set content panel 97 first displays an inter-group link set identifier 98 indicating in this case that the inter-group link set under investigation is that adapted to carry a plurality of signals between the STL NE, and one or more "off page" NE's, namely those contained in NE groups other than the Northeast NE group 42 displayed in the network topology panel 58. The inter-group link set content panel 97 also displays the names 100 assigned to each of the links of which the inter-group link set under investigation is comprised, and an identification of the two NE's (102 and 104) between which each link carries a signal. In this example, these two NE's are identified using the terms "NE A" and "NE Z", with the "NE A" identifying the transferring NE, namely the NE of the NE group displayed in the network topology panel 58 from which the links of the selected inter-group link set extend, and "NE Z" identifying the terminating NE, namely the NE at which each of the links of the selected inter-group link set terminates. The inter-group link set content panel also displays the NE group 106 to which each terminating NE belongs. In the illustrated example, the selected inter-group link set has four links, all extending from the STL NE. Three of these links terminate at the DEN NE of the Northwest NE group, while the fourth terminates at the MEM NE of the Southeast NE group.

The inter-group link set content panel 97 also allows the network administrator to select one of the links of which the selected inter-group link set is comprised, and to follow it to its terminating NE. At the right end of the inter-group link set content panel 97 displayed in FIG. 5 appear two features whose purpose is to facilitate this task. The first feature is a follow-link selectable icon 108. The second feature is a new window selector 110, which in this example is a check box. If the new window selector 110 is not checked, then upon selection of one of the links displayed in the inter-group link set content panel 97, as well as the follow-link icon 108, the graphical representations and information displayed in the first network view window 56 for the Northeast NE group 42 would be replaced by graphical representations and information for the NE group containing the terminating NE of the selected link. If the new window selector 110 is checked, then selection of one of the links and the follow-link icon 108 would result in a second network view window opening (not shown) which would have the same features as the first network view window except that it would display graphical representations and information for the NE group containing the terminating NE of the selected link.

Figure 6:
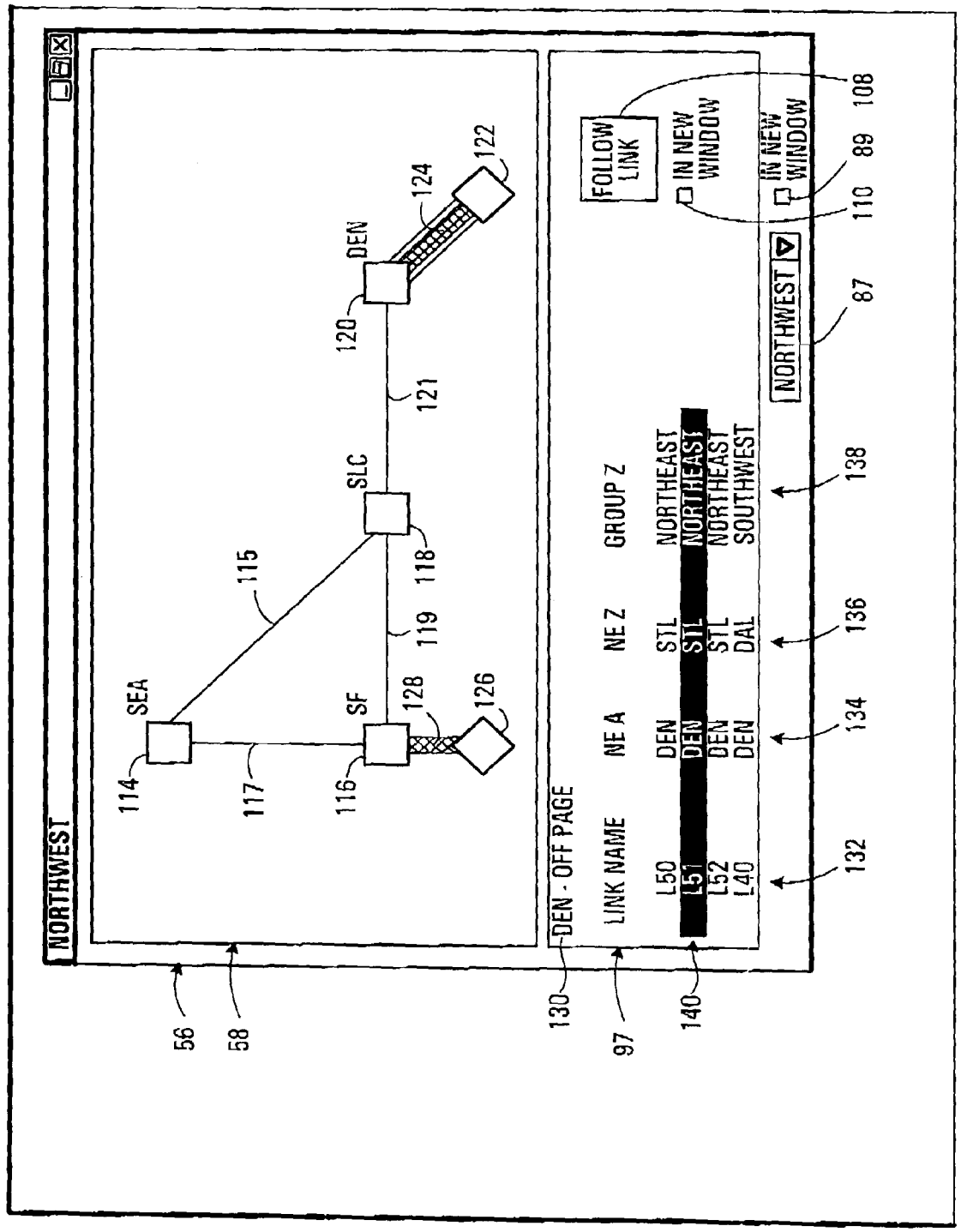
FIG. 6 illustrates the first network view window of FIG. 5 wherein the network administrator has selected to follow an L51 link.

FIG. 6 displays a condition in which the network administrator has selected the L51 link 112 in the inter-group link set content viewer panel of FIG. 5, and has also selected the follow-link icon 108 with the new window selector 110 unchecked. As a result, the first network view window 56 has been refreshed with graphical representations and information for the NE group containing the terminating NE of the selected link, in this case the Northwest NE group 44 which contains the DEN NE.

Thus, the network topology panel 58 now displays NE icons (114, 116, 118 and 120) and link lines (115, 117, 119 and 121) representing the NE's and links of the Northwest NE group 44. The network topology panel 58 also displays off-page connector icons 122 and 126 proximate to the DEN NE icon 120 and SF NE icon 116 respectively, to indicate that there exist one or more links between each of these two NE's and NE's of other NE groups. In both cases, there are multiple such inter-group links in an inter-group link set and as such inter-group link set lines 124 and 128 are displayed between each of the DEN NE icon 120 and SF NE icon 116, and their associated off-page connector icons 122 and 126.

Because the network administrator had selected the L51 link in navigating to the Northwest NE group 44 as displayed in FIG. 6, it is information for the inter-group link set containing link L51 which is displayed in the inter-group link set content panel in FIG. 6. In this example, this inter-group link set is the group of links connecting the DEN NE with NE's of other NE groups. Thus, the inter-group link set identifier 130 in the inter-group link set content panel 97 states that it is information relating to the "DEN-Off page" inter-group link set which is displayed in the inter-group link set content panel 97. The inter-group link set content panel 97 also displays the link name 132, originating NE 134, terminating NE 136, and terminating NE group 138 for each of the links of this inter-group link set. Further, the particular link, namely L51, used to navigate to the Northwest NE group is highlighted 140 in the inter-group link set content panel.

If at this point the network administrator were to select the follow-link icon again, the first network view window 56 would then display information for the terminating NE of the selected link, namely the STL NE of the Northeast NE group 42, essentially returning the first network view window 56 to the state shown in FIG. 5, except with the L51 link 112 highlighted.

Of course, from the Northwest NE group 44 displayed in FIG. 6, the network administrator could choose to investigate the inter-group link set extending from the SF NE by selecting the inter-group link set line 128 displayed between the SF NE icon 116 and its associated off-page connector icon 126, and then navigate to the Southwest NE group 46 by selecting one of the inter-group links then displayed in the inter-group link set content panel, and selecting the follow-link icon 108.

Figure 7:
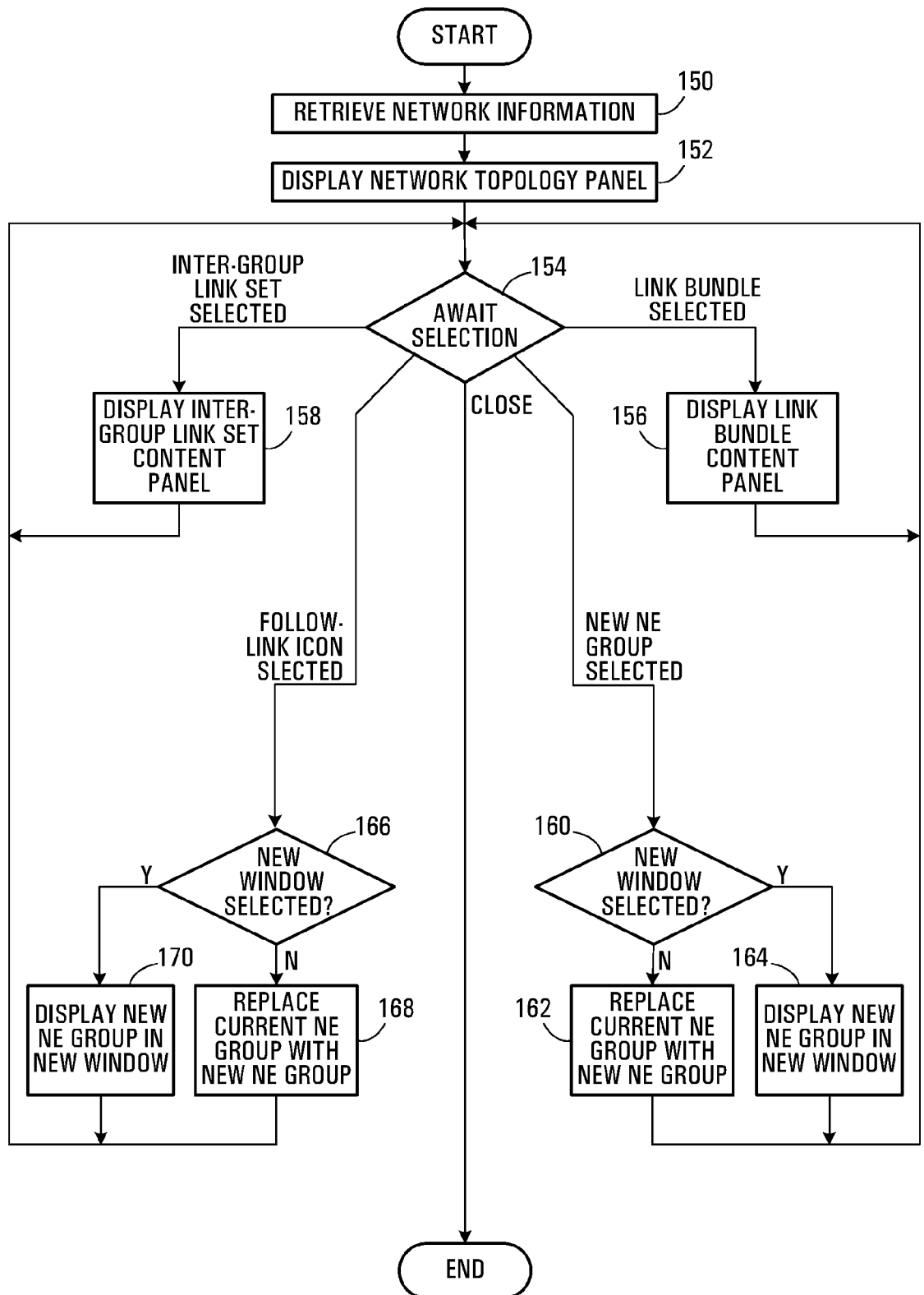
FIG. 7 is a flow chart for a particular example of functionality behind the preferred embodiment of the method of the present invention.

Having described the appearance and panel interaction of a preferred embodiment of the method of the present invention using a demonstration of the method on an exemplary telecommunications network, a particular example of functionality behind the operation of this preferred embodiment method will now be described with reference to the flowchart shown in FIG. 7. More generally, any functionality which is capable of transforming a collection of network connectivity and other network information, along with user inputs, into displays of the type contemplated by the preferred embodiment of the method of the present invention may be employed.

First, upon receipt from the network administrator of an indication of the NE group to be displayed initially, the processor retrieves 150 network information for the selected NE group from the network database 24 and/or the local database 36. The processor 28 then displays 152 on the display 30, a network topology of the selected NE group in a network topology panel 58 of a first network view window 56.

The processor 28 then awaits 154 further instructions from the network administrator.

If the network administrator selects a link bundle line (82 for example) in the network topology panel 58, the processor 28 then displays 156 a link bundle content panel 88 in the first network view window 56, displaying information for the links of which the selected link bundle is comprised. The method then returns to awaiting 154 further selection by the network administrator.

If the network administrator selects an inter-group link set line (86 for example) in the network topology panel 58, then the processor 28 displays 158 an inter-group link set content panel 97 in the first network view window 56, displaying information for the links of which the selected inter-group link set is comprised. The method then returns to awaiting 154 further selection by the network administrator.

If the network administrator selects a new NE group to be displayed, using the NE group selector 87, then the processor 28 retrieves information for the selected NE group from the network database 24 and/or the local database 36, and displays information for the selected NE group either in the first network view window 162, or if the new window selector 89 is checked 160, in a new network view window 164. The method then awaits 154 further instructions from the network administrator.

Once an inter-group link set content panel 97 is displayed and the network administrator selects a displayed link and the follow-link icon 108, then the processor 28 retrieves information for the NE group containing the terminating NE of the selected link from the network database 24 and/or the local database 36, and displays information for that NE group either in the first network view window 168, or if the new window selector 110 is checked 166, in a new network view window 170. The method then awaits 154 further instructions.

Finally, if the network administrator chooses to close the first network view window 56, then the first network view window 56 is closed, and the process is ended.

The above flow chart illustrates a very specific exemplary functionality behind the preferred embodiment of the method of the present invention. However, it is to be understood that many variations may be made to this functionality without necessarily departing from the scope of the present invention. Additionally, only the major features of the functionality of the preferred embodiment method have been described.

It is to be understood that although the appearance of the displays generated by the preferred embodiment of the method of the present invention has been described in detail, it will be understood by a person skilled in the art that many variations may be made to the appearance of the displays without departing from the scope of the present invention. By way of example only, the various icons, lines, etc. may be displayed using shapes, colours, or other visual features other than as used in the illustrated example; the network topology panel, and either the link bundle content panel or inter-group link set content panel may be displayed in orientations other than as illustrated, for example by reversing their orientation, or by placing the panels side by side; other or different link information may be displayed in the link bundle content panel and inter-group link set content panel; and link information in these panels may be displayed graphically instead of in tabular format, or optionally in a combination of graphical and tabular displays.

It is further to be understood that the exemplary telecommunications network used in the demonstration of the preferred embodiment of the method of the present invention, as well as the data displayed in FIGS. 3 through 6 are of course for illustrative purposes only, and that other telecommunication networks may be explored, and other data may be displayed using the present invention.

Although terms such as "originating", "transferring", "terminating" and "extending" are used to describe NE's between which links carry a signal, it is to be understood that these terms are used for convenience of description only, and that these terms do not necessarily correspond with the actual direction of signal traffic on the link.

Additionally, it is to be noted that the present invention also contemplates a computer-readable medium having stored thereon, instructions for directing a computer system to implement the method of the present invention, as well as a computer system adapted to execute a network management application directing a network management computer to implement the method of the present invention.

Numerous modifications and variations of the present invention are possible in light of the above teachings. It is therefore to be understood that within the scope of the appended claims, the invention may be practiced otherwise than as specifically described herein. In particular, although in the foregoing description of a preferred embodiment of the method of the present invention, the functionality of, and information communicated by the method has been described in detail, it is to be understood that the particular functionality of the windows and panels, the particular information displayed in each window and panel, and the manner in which the information is displayed may be altered without necessarily departing from the scope of the present invention which is defined in the claims which follow.

The invention claimed is:

1. A method of displaying a telecommunications network comprising a plurality of network elements interconnected with links, the method comprising:

displaying in a first window a first portion of the telecommunications network, the first portion comprising a first network element and a first link bundle representing a plurality of links for interconnecting the first network element with at least one other network element that is not part of the first portion;

upon selection of the first link bundle, displaying in the first window information for each link of the first link bundle and displaying a follow-link option;

upon selection of the information for a given link of the first link bundle, and upon selection of the follow-link option, displaying a second portion of the telecommunications network comprising a particular network element of the at least one other network element, the particular network element being interconnected to the first network element via the given link, the second portion further comprising a second link bundle representing the given link together with at least one other link; and upon displaying the second portion, indicating in a same window as the second portion that the second portion was entered by the second link bundle via the given link.

2. The method of claim 1 wherein indicating in the same window as the second portion that the second portion was entered by the second link bundle via the given link comprises:

automatically selecting the second link bundle; and
automatically displaying information for the given link of the second link bundle.

3. The method of claim 2 wherein indicating in the same window as the second portion that the second portion was entered by the second link bundle via the given link further comprises:
   automatically displaying information for each link of the second link bundle; and
   automatically selecting the information for the given link of the second link bundle so as to indicate from where the second portion was entered.

4. The method of claim 2 wherein:
   displaying information for each link of the first link bundle comprises displaying information for each link of the first link bundle in tabular format; and
   displaying information for each link of the second link bundle comprises displaying information for each link of the second link bundle in tabular format.

5. The method of claim 2 wherein:
   the information for each link of the first link bundle comprises an identification for the link and an identification of two network elements interconnected by the link; and
   the information for each link of the second link bundle comprises an identification for the link and an identification of two network elements interconnected by the link.

6. The method of claim 1 wherein displaying the second portion comprises:
   displaying the second portion in the first window in lieu of displaying the first portion in the first window.

7. The method of claim 6 further comprising:
   upon further selection of the follow-link option, in absence of selecting the information for another link, displaying the first portion in the first window in lieu of displaying the second portion in the first window.

8. The method of claim 1 further comprising:
   displaying a new window option;
   wherein displaying the second portion comprises:
      if the new window option has been selected, displaying the second portion in a second window; and
      if the new window option has not been selected, displaying the second portion in the first window in lieu of displaying the first portion in the first window.

9. The method of claim 1 wherein the at least one other network element comprises a single other network element, the first link bundle and the second link bundle representing an identical set of links.

10. The method of claim 1 wherein the at least one other network element comprises a plurality of other network elements, each of the plurality of other network elements being interconnected to the first network element via a respective subset of the links of the first link bundle.

11. A computer readable medium having computer executable instructions stored thereof for execution on a processor so as to implement the method of claim 1.

12. A Graphic User Interface (GUI) for a telecommunications network comprising a plurality of network elements interconnected with links, the GUI being operable to:
   display in a first window a first portion of the telecommunications network, the first portion comprising a first network element and a first link bundle representing a plurality of links for interconnecting the first network element with at least one other network element that is not part of the first portion;
   upon selection of the first link bundle, display in the first window information for each link of the first link bundle and display a follow-link option;
   upon selection of the information for a given link of the first link bundle, and upon selection of the follow-link option, display a second portion of the telecommunications network comprising a particular network element of the at least one other network element, the particular network element being interconnected to the first network element via the given link, the second portion further comprising a second link bundle representing the given link together with at least one other link; and
   upon displaying the second portion, indicating in a same window as the second portion that the second portion was entered by the second link bundle via the given link.

13. A network management computer system for a telecommunications network comprising a plurality of network elements interconnected with links, the network management computer system comprising:
   a network database containing therein network information for the telecommunications network;
   a processor coupled to said network database and operable to retrieve network information from the network database;
   a display coupled to said processor for displaying network information; and
   a network information display function operable to:
      display in a first window a first portion of the telecommunications network, the first portion comprising a first network element and a first link bundle representing a plurality of links for interconnecting the first network element with at least one other network element that is not part of the first portion;
      upon selection of the first link bundle, display in the first window information for each link of the first link bundle and display a follow-link option;
      upon selection of the information for a given link of the first link bundle, and upon selection of the follow-link option, display a second portion of the telecommunications network comprising a particular network element of the at least one other network element, the particular network element being interconnected to the first network element via the given link, the second portion further comprising a second link bundle representing the given link together with at least one other link; and
      upon displaying the second portion, indicating in a same window as the second portion that the second portion was entered by the second link bundle via the given link.

14. A method of displaying a telecommunications network comprising a plurality of network elements interconnected with links, the method comprising:
   displaying in a first window a first portion of the telecommunications network, the first portion comprising a first network element and a given link interconnecting the first network element with another network element that is not part of the first portion;
   upon selection of the given link, displaying a follow-link option;
   upon selection of the follow-link option, displaying a second portion of the telecommunications network comprising the another network element interconnected to a link bundle representing the given link together with at least one other link; and
   upon displaying the second portion, indicating in a same window as the second portion that the second portion was entered via the given link of the link bundle.

15. The method of claim 14 wherein indicating in the same window as the second portion that the second portion was entered via the given link of the link bundle comprises:
   automatically selecting the link bundle; and automatically displaying information for the given link of the link bundle.

16. The method of claim 15 wherein indicating in the same window as the second portion that the second portion was entered via the given link of the link bundle further comprises:
automatically displaying information for each link of the link bundle; and
automatically selecting the information for the given link of the link bundle upon displaying the second portion so as to indicate from where the second portion was entered.

17. The method of claim 15 wherein displaying information for each link of the link bundle comprises:
displaying information for each link of the link bundle in tabular format.

18. The method of claim 15 wherein the information for each link of the link bundle comprises: an identification for the link, and an identification of two network elements interconnected by the link.

19. The method of claim 14 wherein displaying the second portion comprises:
displaying the second portion in the first window in lieu of displaying the first portion in the first window.

20. The method of claim 19 further comprising:
upon further selection of the follow-link option, in absence of selecting the information for another link, displaying the first portion in the first window in lieu of displaying the second portion in the first window.

21. The method of claim 14 further comprising:
displaying a new window option;
wherein displaying the second portion comprises:
if the new window option has been selected, displaying the second portion in a second window; and
if the new window option has not been selected, displaying the second portion in the first window in lieu of displaying the first portion in the first window.

22. The method of claim 14 further comprising:
upon selection of the given link of the first portion, displaying in the first window information for the given link.

23. The method of claim 22 wherein displaying the information for the given link comprises:
displaying the information for the given link in tabular format.

24. The method of claim 22 wherein the information for the given link comprises: an identification for the given link, and an identification of two network elements interconnected by the given link.

25. A computer readable medium having computer executable instructions stored thereon for execution on a processor so as to implement the method of claim 14.

26. A Graphic User Interface (GUI) for a telecommunications network comprising a plurality of network elements interconnected with links, the GUI being operable to:
display in a first window a first portion of the telecommunications network, the first portion comprising a first network element and a given link interconnecting the first network element with another network element that is not part of the first portion;
upon selection of the given link, displaying a follow-link option;
upon selection of the follow-link option, display a second portion of the telecommunications network comprising the another network element interconnected to a link bundle representing the given link together with at least one other link; and
upon displaying the second portion, indicating in a same window as the second portion that the second portion was entered via the given link of the link bundle.

27. A network management computer system for a telecommunications network comprising a plurality of network elements interconnected with links, the network management computer system comprising:
a network database containing therein network information for the telecommunications network;
a processor coupled to said network database and operable to retrieve network information from the network database;
a display coupled to said processor for displaying network information; and
a network information display function operable to:
display in a first window a first portion of the telecommunications network, the first portion comprising a first network element and a given link interconnecting the first network element with another network element that is not part of the first portion;
upon selection of the given link, displaying a follow-link option;
upon selection of the follow-link option, display a second portion of the telecommunications network comprising the another network element interconnected to a link bundle representing the given link together with at least one other link; and
upon displaying the second portion, indicating in a same window as the second portion that the second portion was entered via the given link of the link bundle.

28. A method of displaying a telecommunications network comprising a plurality of network elements interconnected with links, the method comprising:
displaying in a first window a first portion of the telecommunications network, the first portion comprising a first network element and a link bundle representing a plurality of links for interconnecting the first network element with a plurality of other network elements that are not part of the first portion;
upon selection of the link bundle, displaying in the first window information for each link of the link bundle and displaying a follow-link option;
upon selection of the information for a given link of the link bundle, and upon selection of the follow-link option, displaying a second portion of the telecommunications network comprising the given link and a particular network element of the plurality of other network elements to which the given link connects; and
upon displaying the second portion, indicating in a same window as the second portion that the second portion was entered via the given link.

29. The method of claim 28 wherein indicating in the same window as the second portion that the second portion was entered via the given link comprises:
automatically selecting the given link of the second portion.

30. The method of claim 29 wherein indicating in the same window as the second portion that the second portion was entered via the given link further comprises:
automatically displaying information for the given link; and
automatically selecting the information for the given link so as to indicate from where the second portion was entered.

31. The method of claim 28 wherein displaying the second portion comprises:

displaying the second portion in the first window in lieu of displaying the first portion in the first window.

32. The method of claim 31 further comprising:
upon further selection of the follow-link option, displaying the first portion in the first window in lieu of displaying the second portion in the first window.

33. The method of claim 28 further comprising:
displaying a new window option;
wherein displaying the second portion comprises:
if the new window option has been selected, displaying the second portion in a second window; and
if the new window option has not been selected, displaying the second portion in the first window in lieu of displaying the first portion in the first window.

34. The method of claim 28 wherein displaying information for each link of the link bundle comprises:
displaying information for link of the link bundle in tabular format.

35. The method of claim 28 wherein the information for each link of the link bundle comprises: an identification for the link, and an identification of two network elements interconnected by the link.

36. The method of claim 28 wherein each of the plurality of other network elements is interconnected to the first network element via a respective subset of the links of the link bundle.

37. A computer readable medium having computer executable instructions stored thereon for execution on a processor so as to implement the method of claim 28.

38. A Graphic User Interface (GUI) for a telecommunications network comprising a plurality of network elements interconnected with links, the GUI being operable to:
display in a first window a first portion of the telecommunications network, the first portion comprising a first network element and a link bundle representing a plurality of links for interconnecting the first network element with a plurality of other network elements that are not part of the first portion;
upon selection of the link bundle, display in the first window information for each link of the link bundle and display a follow-link option;
upon selection of the information for a given link of the link bundle, and upon selection of the follow-link option, display a second portion of the telecommunications network comprising the given link and a particular network element of the plurality of other network elements to which the given link connects; and
upon displaying the second portion, indicating in a same window as the second portion that the second portion was entered via the given link.

39. A network management computer system for a telecommunications network comprising a plurality of network elements interconnected with links, the network management computer system comprising:
a network database containing therein network information for the telecommunications network;
a processor coupled to said network database and operable to retrieve network information from the network database;
a display coupled to said processor for displaying network information; and
a network information display function operable to:
display in a first window a first portion of the telecommunications network, the first portion comprising a first network element and a link bundle representing a plurality of links for interconnecting the first network element with a plurality of other network elements that are not part of the first portion;
upon selection of the link bundle, display in the first window information for each link of the link bundle and display a follow-link option;
upon selection of the information for a given link of the link bundle, and upon selection of the follow-link option, display a second portion of the telecommunications network comprising the given link and a particular network element of the plurality of the other network elements to which the given link connects; and
upon displaying the second portion, indicating in a same window as the second portion that the second portion was entered via the given link.

40. A method of displaying a telecommunications network comprising a plurality of network elements interconnected with links, the method comprising:
displaying in a first window a first portion of the telecommunications network, the first portion comprising a first network element and a link interconnecting the first network element with another network element that is not part of the first portion;
upon selection of the link, displaying a follow-link option;
upon selection of the follow-link option, displaying a second portion of the telecommunications network comprising the another network element and the link; and
upon displaying the second portion, indicating in a same window as the second portion that the second portion was entered via the link.

41. The method of claim 40 wherein indicating in the same window as the second portion that the second portion was entered via the link comprises:
automatically selecting the link of the second portion.

42. The method of claim 41 wherein indicating in the same window as the second portion that the second portion was entered via the link further comprises:
automatically displaying information for the link; and
automatically selecting the information for the link so as to indicate from where the second portion was entered.

43. The method of claim 40 wherein displaying the second portion comprises:
displaying the second portion in the first window in lieu of displaying the first portion in the first window.

44. The method of claim 43 further comprising:
upon further selection of the follow-link option, displaying the first portion in the first window in lieu of displaying the second portion in the first window.

45. The method of claim 40 further comprising:
displaying a new window option;
wherein displaying the second portion comprises:
if the new window option has been selected, displaying the second portion in a second window; and
if the new window option has not been selected, displaying the second portion in the first window in lieu of displaying the first portion in the first window.

46. The method of claim 40 further comprising:
upon selection of the link of the first portion, displaying in the first window information for the link.

47. The method of claim 46 wherein displaying the information for the link comprises:
displaying the information for the link in tabular format.

48. The method of claim 46 wherein the information for the link comprises: an identification for the link, and an identification of two network elements interconnected by the link.

49. A computer readable medium having computer executable instructions stored thereon for execution on a processor so as to implement the method of claim 40.

50. A Graphic User Interface (GUI) for a telecommunications network comprising a plurality of network elements interconnected with links, the GUI being operable to:
- display in a first window a first portion of the telecommunications network, the first portion comprising a first network element and a link interconnecting the first network element with another network element that is not part of the first portion;
- upon selection of the link, display a follow-link option
- upon selection of the follow-link option, display a second portion of the telecommunications network comprising the another network element and the link; and
- upon displaying the second portion, indicating in a same window as the second portion that the second portion was entered via the link.

51. A network management computer system for a telecommunications network comprising a plurality of network elements interconnected with links, the network management computer system comprising:
- a network database containing therein network information for the telecommunications network;
- a processor coupled to said network database and operable to retrieve network information from the network database;
- a display coupled to said processor for displaying network information; and
- a network information display function operable to:
  - display in a first window a first portion of the telecommunications network, the first portion comprising a first network element and a link interconnecting the first network element with another network element that is not part of the first portion;
  - upon selection of the link, display a follow-link option
  - upon selection of the follow-link option, display a second portion of the telecommunications network comprising the another network element and the link; and
  - upon displaying the second portion, indicating in a same window as the second portion that the second portion was entered via the link.

* * * * *